United States Patent
Pena et al.

(10) Patent No.: US 7,494,957 B2
(45) Date of Patent: Feb. 24, 2009

(54) ENERGIZED FLUIDS AND METHODS OF USE THEREOF

(75) Inventors: Alejandro Pena, Houston, TX (US); Golchehreh Salamat, Sugar Land, TX (US); Lijun Lin, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 245 days.

(21) Appl. No.: 11/042,215

(22) Filed: Jan. 24, 2005

(65) Prior Publication Data

US 2006/0166836 A1 Jul. 27, 2006

(51) Int. Cl.
*C09K 8/035* (2006.01)
*C09K 8/20* (2006.01)
*E21B 43/25* (2006.01)

(52) U.S. Cl. .................. 507/211; 507/240; 507/244; 507/246; 507/248; 166/244.1

(58) Field of Classification Search ............. None
See application file for complete search history.

(56) References Cited

U.S. PATENT DOCUMENTS

| | | | | |
|---|---|---|---|---|
| 3,692,676 | A | 9/1972 | Culter et al. | 252/8.55 R |
| 3,937,283 | A | 2/1976 | Blauer et al. | 166/307 |
| 4,199,484 | A | 4/1980 | Murphey | 523/424 |
| 4,368,136 | A | 1/1983 | Murphey | 507/211 |
| 4,940,090 | A * | 7/1990 | Hoskin et al. | 166/270 |
| 5,175,278 | A | 12/1992 | Peik et al. | 536/123 |
| 5,688,844 | A * | 11/1997 | Chatterji et al. | 524/8 |
| 5,782,300 | A | 7/1998 | James et al. | 166/278 |
| 6,110,271 | A | 8/2000 | Skaggs et al. | 106/804 |
| 6,221,152 | B1 * | 4/2001 | Dial et al. | 106/805 |
| 6,227,295 | B1 * | 5/2001 | Mitchell et al. | 166/300 |
| 6,258,757 | B1 * | 7/2001 | Sweatman et al. | 507/219 |
| 6,258,859 | B1 * | 7/2001 | Dahayanake et al. | 516/77 |
| 6,454,008 | B1 * | 9/2002 | Chatterji et al. | 166/308.6 |
| 6,482,866 | B1 | 11/2002 | Dahayanake et al. | 516/77 |

(Continued)

FOREIGN PATENT DOCUMENTS

EP 0 209 277 4/1990

(Continued)

OTHER PUBLICATIONS

R.C. Navarrete, J.M. Seheult, M.D. Coffey; "New Bio-Polymers for Drilling, Drill-In, Completions, Spacer Fluids and Coiled Tubing"; Proceedings from IADC/SPE Asia Pacific Drilling Technol. Conference; Sep. 11-13, 2000.*

(Continued)

*Primary Examiner*—Randy Gulakowski
*Assistant Examiner*—John J Figueroa
(74) *Attorney, Agent, or Firm*—David Cate; Dorla Fonseca; Robin Nava (57) ABSTRACT

The present invention relates to novel aqueous wellbore treatment fluids containing a gas component, a heteropolysaccharide, an electrolyte, and a surfactant, wherein the fluids may further include an organoamino compound. The fluids exhibit good rheological properties at elevated temperatures. Methods of use of fluids comprising at least an aqueous medium, a gas component, a heteropolysaccharide and a surfactant for hydraulically fracturing, well cleanup and gravel packing operations, are also disclosed.

20 Claims, 3 Drawing Sheets

U.S. PATENT DOCUMENTS

| | | | | |
|---|---|---|---|---|
| 6,599,863 | B1 | 7/2003 | Palmer et al. | 507/219 |
| 6,620,775 | B2 | 9/2003 | Winston et al. | 510/470 |
| 6,703,352 | B2 | 3/2004 | Dahayanake et al. | 507/241 |
| 6,720,290 | B2 | 4/2004 | England et al. | 507/244 |
| 6,903,062 | B2 * | 6/2005 | Griese et al. | 510/405 |
| 2003/0100460 | A1 | 5/2003 | Winston et al. | 510/214 |
| 2003/0139297 | A1 * | 7/2003 | Quintero | 507/100 |
| 2004/0121932 | A1 | 6/2004 | Griese et al. | 510/417 |
| 2005/0261138 | A1 * | 11/2005 | Robb et al. | 507/209 |
| 2006/0009363 | A1 * | 1/2006 | Crews | 507/100 |

FOREIGN PATENT DOCUMENTS

WO        WO9722564 A1    6/1997

OTHER PUBLICATIONS

Pollock, T.J., Sphingan Group of Exopolysaccharides (EPS), in Biopolymers, vol. 5, E.J. Vandamme, S. DeBaets, and A. Steinbuucchel, Editors. 2002, Wiley-VCH Verlag GmbH. p. 239-258.

Kuo, M.S., A.J. Mort, and A. Dell, Identification and location of L-glycerate, an unusual acyl substituent in gellan gum. Carbohydrate Research, 1986. 156: p. 173-187.

Stankowski, J.D. and S.G. Zeller, Location of the O-acetyl group in welan by teh reductive-cleavage method. Carbohydrate Research, 1992. 224: p. 337-341.

Chowdhury, T.A., et al., Structural studies of an extracellular polysaccharide, S-657, elaborated by Xanthomonas ATCC 53159. Carbohydrate Research, 1987. 164: p. 117-122.

Jansson, P.E., et al., Structural studies of a polysaccharide (S-194) elaborated by Alcaligenes ATCC 31961. Carbohydrate Research, 1986. 156: p. 157-163.

Jannson, P.E., N.S. Kumar, and B. Lindberg, Structural studies of a polysaccharide (S-88) elaborated by Pseudomonas ATCC 31554. Carbohydrate Research, 1986. 156: p. 165-172.

Chowdhury, T.A., B. Lindberg, and U. Lindquist, Structural studies of an extracellular polysaccharide (S-198) elaborated by Alcaligenes ATCC 31853. Carbohydrate Research, 1987. 161: p. 127-132.

Diltz, S. and S.G. Zeller, Location of O-acetyl groups in S-657 using the reductive-cleavage method. Carbohydrate Research, 2001. 331: p. 265-270.

SPE 80242—A Circulating Foam Loop for Evaluating Foam at Conditions of Use By Richard D. Hutchins, Matthew J. Miller.

* cited by examiner

FIG. 2a Temperature = 38 °C

FIG. 2b Temperature = 110 °C

FIG. 2c Temperature = 135 °C

FIG. 2d Temperature = 149 °C

Effect of tetraethyleneamine on viscosity

FIG. 3b

Effect of KCl content on stability at Temperature = 121 °C

FIG. 3

ENERGIZED FLUIDS AND METHODS OF USE THEREOF

BACKGROUND OF THE INVENTION

This invention relates to fluids used in treating a subterranean formation. In particular, The invention is aqueous energized wellbore treatment fluids containing a heteropolysaccharide, methods of forming such fluids, and uses thereof.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like.

Fluid technologies incorporating a gaseous component or a supercritical fluid to form a foam or energized fluid are commonly used in the stimulation of oil and gas wells. For example, some viscoelastic fluids used as fracturing fluids contain a gas such as air, nitrogen or carbon dioxide to provide an energized fluid or foam. Such fluids are commonly formed by injecting an aqueous solution ("base fluid") concomitantly with a gas, most commonly nitrogen, carbon dioxide or their mixtures, into the formation. Among other benefits, the dispersion of the gas into the base fluid in the form of bubbles or droplets increases the viscosity of such fluid and impacts positively its performance, particularly its ability to effectively induce hydraulic fracturing of the formation, and also its capacity to carry solids ("proppants") that are placed within the fractures to create pathways through which oil or gas can be further produced. The presence of the gas also enhances the flowback of the base fluid from the interstices of the formation and of the proppant pack into the wellbore, due to the expansion of such gas once the pressure is reduced at the wellhead at the end of the fracturing operation. Other common uses of foams or energized fluids include wellbore cleanout, gravel packing, acid diversion, fluid loss control, and the like.

The viscosity of the fluid in which the gas is dispersed affects the resulting viscosity and stability of the foam. In general, foams are more stable and viscous as the viscosity of the base fluid increases. For this reason, high molecular weight polymers are commonly added to increase the viscosity of the base fluid. Commonly used polymers for fracturing applications are polysaccharides such as cellulose, derivatized cellulose, guar gum, derivatized guar gum, xanthan gum, or synthetic polymers such as polyacrylamides and polyacrylamide copolymers.

Incorporating crosslinkers into the fluid further augments the viscosity of the base fluid. Crosslinking consists of the attachment of two polymeric chains through the chemical association of such chains to a common element or chemical group, whereas such element or group is referred to as the crosslinker. Typical crosslinkers are polyvalent metal ions, more often zirconium or titanium ions, or borate ions. Crosslinking is very sensitive to the prevailing pH. For example, crosslinking with borate ions can be performed only in alkaline media (pH>8). pH-regulating systems ("buffers") are often required to achieve effective crosslinking with metal ions.

Foamed and energized fracturing fluids invariably contain "foamers", most commonly surfactant or blends of surfactants that facilitate the dispersion of the gas into the base fluid in the form of small bubbles or droplets, and confer stability to the dispersion by retarding the coalescence or recombination of such bubbles or droplets. Foamed and energized fracturing fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value.

Hydraulic fracturing is a stimulation technique routinely performed on oil and gas wells to increase fluid production from subterranean reservoirs. Specially engineered fluids, including energized fluids thickened with viscoelastic surfactants or polymeric gelling agents, are often pumped at high pressures and rates into the reservoir to be treated, causing a fracture to open. Proppants, such as ceramic beads or grains of sand, are slurried with the treating fluid (also referred to as carrier fluid) to keep the fracture open once the treatment is completed. Hydraulic fracturing creates high-conductivity communication with a large area of a formation and bypasses any damage that may exist in the near-wellbore area. It is therefore important for the treatment fluid to have enough viscosity to suspend and carry the proppant into the fracture zone. In some cases, however, depending upon specific subterranean formation conditions or job designs, energized fluids may not have high enough viscosity to achieve optimum proppant transportation and suspension, thereby resulting in poor proppant placement. Increased levels of viscosifying agent or surfactants may be required to achieve adequate proppant placement, thus leading to increased resource and material requirements.

The ability to formulate stable energized fluids with rheological properties suitable for fracturing operations becomes increasingly difficult as the temperature of the subterranean formation increases. The matter is worsened when carbon dioxide is present in the gas phase, since carbon dioxide exhibits high solubility in aqueous solutions. The high solubility of carbon dioxide facilitates mass transfer between bubbles and accelerates foam-destabilizing mechanisms such as so-called Ostwald ripening, which ultimately lead to phase separation and to the loss of fluid viscosity. Furthermore, carbon dioxide reacts with water to form carbonic acid. The formation of carbonic acid imposes a low pH environment for the fluid (typically in the range 3.5-4), thus impeding the necessary control of pH for efficient crosslinking with borate ions and often with other metallic ions. Exposure to low pH and high temperatures promotes degradation of the polymeric chains, particularly if polysaccharides are used as viscosifying agents, thus contributing to the referred loss of foam stability and viscosity.

The need to identify suitable chemicals to formulate viscous foams and energized fluids containing carbon dioxide, particularly at elevated temperatures in excess of about 93° C., and more particularly at temperatures in excess of about 121° C., is known to those skilled in the art. Furthermore, there are needs for improved methods to utilize such formulations in the treatment and fracturing of subterranean formations penetrated by a wellbore. Therefore, the need exists for stable energized fluids for oilfield treatments exhibiting excellent proppant transport and suspension capabilities at elevated temperatures. A fluid that can achieve the above would be highly desirable. These needs are met at least in part by the following invention.

SUMMARY OF THE INVENTION

The invention provides energized aqueous wellbore treatment fluids containing a heteropolysaccharide, a gas component, an electrolyte, a surfactant, and may further include an organoamino compound. The fluids have adequate rheology for good proppant suspension and transport properties, and also exhibit excellent stability against phase separation both at moderate and elevated temperatures.

In one embodiment of the invention, the aqueous wellbore treating fluids contain carbon dioxide as the gas component incorporated in an amount from about 40% to about 70% of total fluid volume, a sphingan diutan gum heteropolysaccharide incorporated in an amount from about 0.10% to about 0.40% by weight of total liquid phase weight, a zwitterionic surfactant incorporated in an amount from about 0.05% to about 2.00% by weight of total liquid phase weight, and potassium chloride as electrolyte incorporated in an amount from about 1% to about 8% by weight of total liquid phase weight. In some embodiments of the invention, the treating fluids also contain tetraethylenepentamine incorporated in an amount from about 0.05% to about 1.00% by weight of total liquid phase weight.

The invention also provides a method for producing a wellbore treatment fluid including the steps of providing an aqueous medium, a gas component, a heteropolysaccharide, a surfactant, and wherein the aqueous medium, gas component, heteropolysaccharide, electrolyte, and surfactant are combined to form the fluid. A method of fracturing a subterranean formation is also provided wherein a fluid comprising an aqueous medium, a gas component, a heteropolysaccharide, and a surfactant is injected into a subterranean formation at a pressure sufficient to fracture the formation.

The invention further includes the use of fluids comprising an aqueous medium, a gas component, a heteropolysaccharide, an electrolyte, and surfactant to fracture a subterranean formation, for cleanup operations and for gravel packing a wellbore.

DETAILED DESCRIPTION OF THE PREFERRED EMBODIMENTS

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context.

The invention provides well treatment fluids useful for treating a subterranean formation. In particular, the invention is aqueous wellbore treatment fluids containing a heteropolysaccharide, methods of forming such treatment fluids, and uses thereof. As used herein, the term "liquid phase" is meant to include all components of the fluid except the gas phase. The term "gas" is used herein to describe any fluid in a gaseous state or in a supercritical state, wherein the gaseous state refers to any state for which the temperature of the fluid is below its critical temperature and the pressure of the fluid is below its vapor pressure, and the supercritical state refers to any state for which the temperature of the fluid is above its critical temperature. As used herein, the terms "energized fluid" and "fluid" are used interchangeably to describe any stable mixture of gas phase and liquid phase, including foams, notwithstanding the foam quality value, i.e. the ratio of gas volume to the total volume of gas and liquid phases.

Energized fluids are often used in the stimulation of oil and gas wells, and are formed and applied by injecting an aqueous solution concomitantly with a gas (most commonly nitrogen, carbon dioxide or their mixtures). The dispersion of the gas into the base fluid in the form of bubbles increases the viscosity of such fluid and impacts positively its performance, particularly its ability to effectively induce hydraulic fracturing of the formation, and also its capacity to carry solids, such as proppants. The presence of the gas also enhances the flowback of the fluid. It is commonly known that stable energized fluids or foams with rheology properties suitable for oilfield operations becomes increasingly difficult when the formation temperature is above 121 ° C., or even up to 150° C. It has been unexpectedly discovered that combining a heteropolysaccharide, such as a sphingan, concomitantly with a gas, an electrolyte, and a surfactant, provides an aqueous energized fluid with exceptional rheology properties, particle suspension and particle transport capabilities, as well as gas phase stability, especially at elevated temperatures. As such, aqueous energized fluids of the invention include an aqueous medium, a gas component, a heteropolysaccharide, an electrolyte, and a surfactant. The aqueous medium is usually water or brine. The fluids may also include an organoamino compound. When used as fracturing fluids, embodiments of the invention may further include a proppant.

Fluid compositions of the invention are useful in oilfield operations, including such operations as fracturing subterranean formations, modifying the permeability of subterranean formations, fracture or wellbore cleanup, acid fracturing, matrix acidizing, gravel packing or sand control, and the like. Another application includes the placement of a chemical plug to isolate zones or to assist an isolating operation.

The gas component of the fluids of the present invention may be produced from any suitable gas that forms an energized fluid when introduced into the aqueous medium. See, for example, U.S. Pat. No. 3,937,283 (Blauer et al.) hereinafter incorporated by reference. Preferably, the gas component comprises a gas selected from the group consisting of nitrogen, air, carbon dioxide and any mixtures thereof. More preferably the gas component comprises carbon dioxide, in any quality readily available. The gas component assists in the fracturing operation and the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

Fluids of the invention include a heteropolysaccharide. While any suitable heteropolysaccharide may be used, microbial polysaccharides commonly known as sphingans are particularly useful. Sphingans generally are acidic capsular heteropolysaccharides secreted by Sphingomonas bacteria as described by Pollock, T. J., Sphingan Group of Exopolysaccharides (EPS), in Biopolymers, Vol. 5, E. J. Vandamme, S. DeBaets, and A. Steinbüchel, Editors. 2002, Wiley-VCH Verlag GmbH, p. 239-258. In some embodiments of the invention, the heteropolysaccharide is an sphingan or a derivatized sphingan having a tetrasaccharide repeating unit in the polymer backbone as represented by the chemical formula:

or represented by the alternative formula scheme:

wherein at least three different saccharides are present in the repeating unit, such saccharides including D-glucose (D-Glc), D-glucuronic acid (D-GlcA), and either L-rhamnose (X =Rha; $R^{11}$=CH$_3$) or L-mannose (X=Man; $R^{11}$=CH$_2$OH); the weight average molecular weight (Mw) for the heteropolysaccharide is from about $10^5$ to about $10^7$; M$^+$ is any ionic species effective to associate via electrostatic interactions with the carboxylic group present in the D-glucuronic acid unit, wherein M$^+$ includes, for example, but not necessarily limited to: H$^+$, Na$^+$, K$^+$, NH4$^+$, ½ Ca$^{+2}$ and ½ Mg$^{+2}$; substituents for the number 2 positions of all saccharide units ($R^3$, $R^5$, $R^8$, and $R^{10}$), substituents for the number 3 positions of the position number 4-linked saccharide units ($R^4$, $R^7$, and $R^9$), substituent for the number 4 position of the position 3-linked glucose unit ($R^2$), and substituents for the number 6 positions of the D-glucose units ($R^1$ and $R^6$) may be by non-limiting example a hydrogen (—H), methyl (—CH$_3$), acetyl (—COCH$_3$), glyceryl (—COCH$_2$(OH)CH$_2$OH) or a saccharide group containing one to three saccharides units, wherein the saccharide units present in the saccharide side-group include, but are not limited to: D-glucose, D-glucuronic acid, D-galacturonic acid, L-rhamnose, L-mannose, D-mannose, 2,3:5,6-gi-O-isopropylidene-D-mannofuranose, 2,3-O-isopropylidene-D-ribono-1,4-lactone, 3,4-O-isopropylidene-D-mannitol, D-arabinose, L-arabinose, D-erythrose, L-erythrose, D-fucose, L-fucose, lactulose, D-lyxose, maltulose, L-mannitol, D-mannono-1,4-lactone, L-mannono-1,4-lactone, methyl-α-D-fucopyranoside, D-ribonic acid, D-ribono-1,4-lactone, L-ribose, D-sorbose, D-tagatose, D-talitol, D-talose, L-pylons, and the like, and any derivatives. Also, the substituents $R^1$ thru $R^{11}$ above may differ from repeating unit to repeating unit within the heteropolysaccharide's backbone chemical structure. For example, $R^1$ could be hydrogen (—H) in one repeating unit and an acetyl group (—COCH$_3$) in the following repeating unit.

Suitable sphingans or derivatized sphingans include, but are not necessarily limited to, the following heteropolysaccharides and derivatives thereof:

gellan gum as described in Kuo, M. S., A. J. Mort, and A. Dell, Identification and location of L-glycerate, an unusual acyl substituent in gellan gum, Carbohydrate Research, 1986, 156: p. 173-187, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methyl (—CH$_3$) group (or X=Rha);

welan gum as described by Stankowski, J. D. and S. G. Zeller, Location of the O-acetyl group in welan by the reductive-cleavage method, Carbohydrate Research, 1992, 224: p. 337-341, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is an α-L-rhamnose or α-L-mannose group (α-L-Rha (1→, or α-L-Man (1→);

diutan gum as described by Chowdhury, T. A., et al., Structural studies of an extracellular polysaccharide, S-657, elaborated by Xanthomonas ATCC 53159, Carbohydrate Research, 1987, 164: p. 117-122, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is two α-L-rhamnose groups linked at the 1,4 ring positions (α-L-Rha (1→4) α-L-Rha (1→);

rhamsan gum as described by Jansson, P. E., et al., Structural studies of a polysaccharide (S-194) elaborated by Alcaligenes ATCC 31961, Carbohydrate Research, 1986, 156: p. 157-163, wherein $R^2$, $R^3$, $R^4$, $R^5$, $R^6$, $R^7$, $R^8$, $R^9$, and $R^{10}$ are hydrogen (—H) groups, $R^{11}$ is a methyl (—CH$_3$) group (or X=Rha), and $R^1$ is two β-D-glucose groups linked at the 1,6 ring positions (β-D-Glc (1→6) β-D-Glc (1→);

heteropolysaccharide S-88 as described by Jannson, P.E., N. S. Kumar, and B. Lindberg, Structural studies of a polysaccharide (S-88) elaborated by Pseudomonas ATCC 31554, Carbohydrate Research, 1986, 156: p. 165-172, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (X=Rha) or methylol (—CH$_2$OH) group (X=Man), and $R^7$ is an α-L-rhamnose group (α-L-Rha (1→);

heteropolysaccharide S-198 as described by Chowdhury, T. A., B. Lindberg, and U. Lindquist, Structural studies of an extracellular polysaccharide (S-198) elaborated by Alcaligenes ATCC 31853, Carbohydrate Research, 1987, 161: p. 127-132, wherein $R^1$, $R^3$, $R^4$, $R^5$, $R^6$, $R^7$, $R^8$, $R^9$, and $R^{10}$ are hydrogen (—H) groups, $R^{11}$ is a methyl (—CH$_3$) group (X=Rha) or methylol (—CH$_2$OH) group (X=Man), and $R^2$ is an α-L-rhamnose group (α-L-Rha (1→); and, heteropolysaccharide NW11 as described in Pollock, T. J., Sphingan Group of Exopolysaccharides (EPS), in Biopolymers, Vol. 5, E. J. Vandamme, S. DeBaets, and A. Steinbüchel, Editors, 2002, Wiley-VCH Verlag GmbH, p. 239-258, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methylol (—CH$_2$OH) group (X=Man).

Preferably, the heteropolysaccharide used in fluids of the invention is a diutan gum having a tetrasaccharide repeating unit in the polymer backbone as represented by the chemical formula:

or represented by the alternative formula scheme:

wherein $M^+$ is any ionic species effective to associate via electrostatic interactions with the carboxylic group, wherein $M^+$ includes, for example, but not necessarily limited to, $H^+$, $Na^+$, $K^+$, $NH4^+$, $\frac{1}{2}Ca^{+2}$; and $\frac{1}{2}Mg^{+2}$; and the weight average molecular weight (Mw) for the diutan gum is from about $10^5$ to about $10^7$. Diutan heteropolysaccharides are available, for example, from CP Kelco of 123 North Wacker Dr, Suite 2000 Chicago, Ill. 60606 USA, and may also be used in either crosslinked form, or without crosslinker. Diutan is generally composed of carbohydrate, about 12% protein and about 7% (calculated as O-acetyl) acyl groups, where the carbohydrate portion containing about 19% glucuronic acid, and the neutral sugars rhamnose and glucose are present in the approximate ratio of 2:1. Details of preparing diutan are given in U.S. Pat. No. 5,175,278 (Peik et al.), hereby incorporated by reference. O-acetyl groups may also be present on the number 2 position and the 2,6-positions of the 3-linked D-Glucose unit as described in Diltz, S. and S. G. Zeller, Location of O-acetyl groups in S-657 using the reductive-cleavage method. Carbohydrate Research, 2001. 331: p. 265-270.

Heteropolysaccharides are incorporated into the fluid embodiments of the invention in amounts ranging from about 0.01% to about 1.0% by weight of total weight of liquid phase, and preferably from about 0.10% to about 0.40% by weight of total weight of liquid phase. The term liquid phase means all components of the fluid except the gas component.

In some embodiments, the heteropolysaccharide may be crosslinked with a suitable crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, and zirconium.

The fluids of the invention include an electrolyte which may be an organic acid, organic acid salt, or inorganic salt. Mixtures of the above members are specifically contemplated as falling within the scope of the invention. This member will typically be present in a minor amount (e.g. less than about 30% by weight of the liquid phase).

The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-napthoic acid, 6- hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4- dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In a preferred embodiment of the invention, the electrolyte is potassium chloride. The electrolyte is preferably used in an amount of from about 0.01 wt % to about 12.0 wt % of the total liquid phase weight, and more preferably from about 1.0 wt % to about 8.0 wt % of the total liquid phase weight.

Aqueous fluid embodiments of the invention may also comprise an organoamino compound. Examples of suitable organoamino compounds include, but are not necessarily limited to, tetraethylenepentamine, triethylenetetramine, pentaethylenhexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

Energized fluids according to the invention also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds.

Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants in an amount of about 0.02 wt % to about 5 wt % of total liquid phase weight, and more preferably from about 0.05 wt % to about 2 wt % of total liquid phase weight.

Friction reducers may also be incorporated into fluids of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Fluids based on the invention may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation caused by borate ion is reversible.

Embodiments of the invention may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

The aqueous medium of the present invention may be water or brine. In those embodiments of the invention where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/ clean up fluid brine phase is chosen to have the same brine phase.

A fiber component may be included in the fluids of the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type synthetic polymer fibers), fibrillated synthetic organic fibers, ceramic fibers, inorganic fibers, metal fibers, metal filaments, carbon fibers, glass fibers, natural polymer fibers, and any mixtures thereof Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Fluid embodiments of the invention may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude. oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine.

Another embodiment of the invention includes the use of fluids of the invention for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In most cases, a hydraulic fracturing consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added. The use of the aqueous energized fluids according to the invention diminishes the single dominance of the viscosifying agent on proppant suspension and transport ability, as well as improves proppant suspension and transport ability at elevated temperatures in excess of about 93° C., and particularly at temperatures in excess of about 121° C.

In the fracturing treatment, fluids of the present invention may be used in the pad treatment, the proppant stage, or both. The components of the liquid phase are preferably mixed on the surface. Alternatively, the fluid may be prepared on the surface and pumped down tubing while the gas component could be pumped down the annular to mix down hole, or vice versa.

Yet another embodiment of the invention includes the use fluids based on the invention for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore. While breakers are typically used in cleanup as energized fluids, the fluids of the invention are inherently effective for use in cleanup operations, with or without a breaker.

In another embodiment, the present invention relates to use of fluids based on the invention for gravel packing a wellbore. As a gravel packing fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate the compositions and methods of the present invention, as described in the preferred embodiments.

Energized fluid viscosity measurements were performed with a fully automated high-pressure-high-temperature capillary rheometer, Chandler-Schlumberger Foam Rheometer System. Details on the operation of the equipment are reported in Hutchins, R. D. and Miller, M. J., A Circulating Foam Loop for Evaluating Foam at Conditions of Use, SPE paper 80242, SPE International Symposium on Oilfield Chemistry, Houston, USA, 5-7 Feb. 2003. The equipment was calibrated in compliance with ISO-9001 standards. The rheometer includes a 416-mL closed flow loop in which aqueous solution and gas are injected in that order to achieve a desired liquid/gas composition of the foam. The equipment is provided with a mass flowmeter, Micro Motion ELITE CMF010 sensor provided with model 2700 transmitter, both available from Emerson Process Management of 7070 Winchester Circle, Boulder, USA 80301, that determines flow rate and density of the fluid. The measured flow rate is used to determine the working speed of a positive displacement pump, Series 220 available from Micropump, Inc. of 1402 NE 136th Avenue, Vancouver, USA 98684-0818, that was needed to achieve the shear rate indicated by the user through a software interface, Chandler FoamLoop DACS v. 1.12.1, available from Chandler Engineering of 2001 Indianwood Avenue Broken Arrow, USA 74012-1163. The pressure drop along a 6.1 meter long 6.4 millimeter outside diameter stainless steel tubing was measured with a pressure transducer, a Rosemount model 3051 available from Emerson Process Management, to determine the apparent viscosity. The software referred above calculated shear rate and apparent viscosity using equations based on fluid mechanic principles, see Hutchins, R. D. and Miller, M. J., above. Temperature was set through the software, which controls the operation of an oven, model MO1440SC from Lindberg/Blue of 308 Ridgefield Ct, Asheville, USA 28806, in which most of the tubing is enclosed. Temperature was uniformly maintained in sections of the tubing outside the oven with an electrical heat tracing system model TBX4LC-HPC available from Thermon of 100 Thermon Dr., San Marcos, USA 78666. The gas/liquid composition of the energized fluid was verified through the measured density. In all cases, experiments were performed at pressure of about 17.2 MPa.

Example 1

Figures 1, 1B:
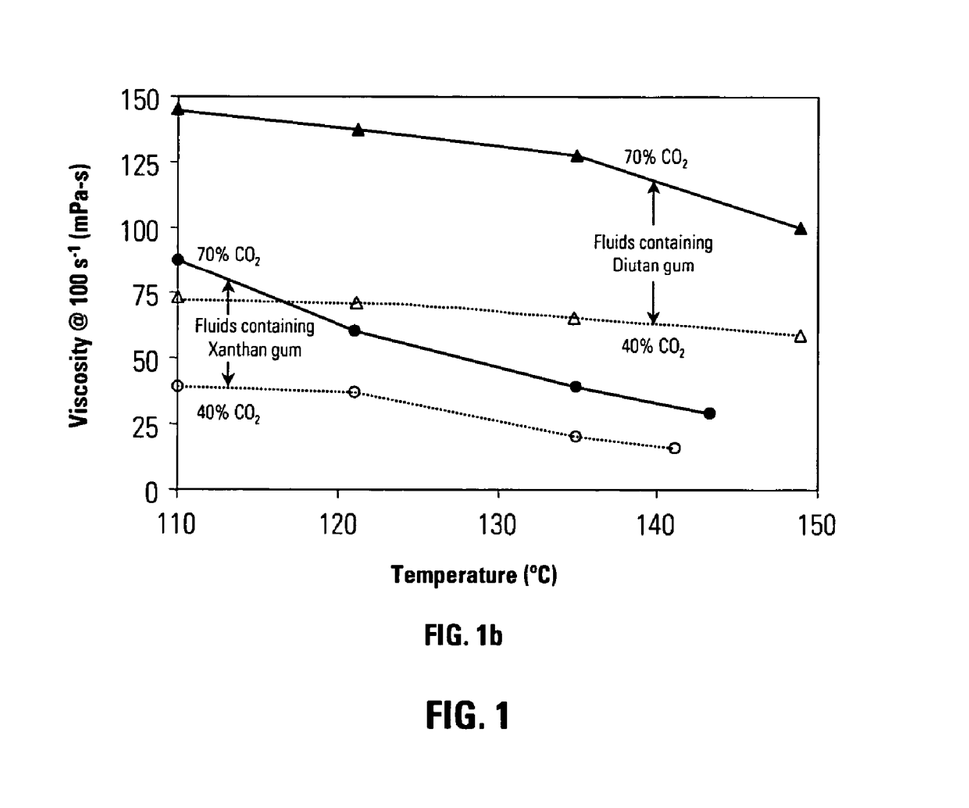
FIG. 1 shows a pair of graphical representations 1a 1b illustrating the high temperature viscosity benefits of a representative sphingan heteropolysaccharide over polysaccharides typically used in foam fracturing operations such as cross-linked carboxymethyl hydroxypropyl guars and xanthan gum.
Figure 1A:
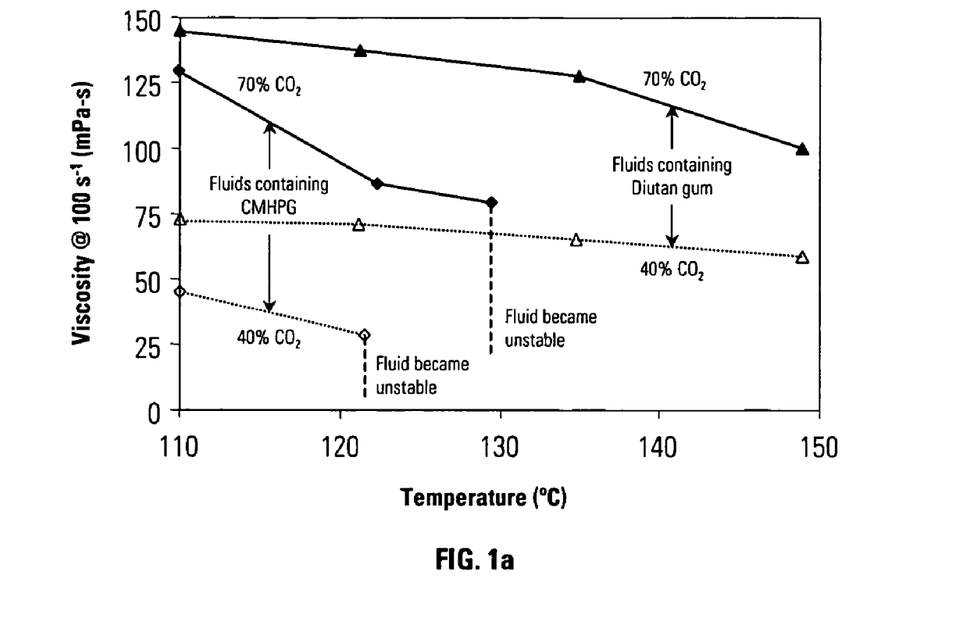

FIG. 1 shows viscosity measurements at a shear rate of 100 s$^{-1}$ for energized fluids of carbon dioxide dispersed in aqueous solutions of several polysaccharides. FIG. 1a shows such measurements for fluids containing a sphingan diutan gum heteropolysaccharide (available from CP Kelco of 123 North Wacker Dr, Suite 2000 Chicago, Ill. 60606 USA) (triangles) and of polysaccharide carboxymethyl hydroxypropyl guar gum (Galactasol 650® available from Aqualon Oil Field Chemicals, 5210 Mariners Harbor Houston, USA 77041) (diamonds). Results are shown for two different volume fractions of carbon dioxide (70 vol. %, filled symbols, and 40 vol. %, open symbols). All amounts and percentages are expressed in wt % of ingredient based upon total liquid phase weight (not including the gas component) unless otherwise indicated. The composition of the aqueous fluid containing heteropolysaccharide diutan gum is:

TABLE 1

| Ingredient | % by weight of total liquid wt |
| --- | --- |
| Water | 91.98 |
| Diutan gum | 0.22 |
| Potassium Chloride | 7.00 |
| Tetraethylenepentamine | 0.50 |
| Amphoteric Alkyl Amine Aquat 944 ® | 0.30 |
| TOTAL | 100.00% |

The composition of the aqueous fluid containing carboxymethyl hydroxypropyl guar gum (CMHPG) is:

TABLE 2

| Ingredient | % by weight of total liquid wt |
| --- | --- |
| Water | 91.95 |
| Galactasol 650 ® CMHPG | 0.41 |
| Potassium Chloride | 7.00 |
| Sodium Thiosulfate | 0.09 |
| Acetic Acid | 0.15 |
| Sodium Zirconium Lactate | 0.10 |
| Amphoteric Alkyl Amine Aquat 944 ® | 0.30 |
| TOTAL | 100.00% |

In the latter carboxymethyl hydroxypropyl guar gum formulation, sodium thiosulfate is used to minimize thermal degradation of CMHPG at elevated temperatures, acetic acid is added prior to the addition of CMHPG to adjust pH and allow efficient hydration of the guar derivative and sodium zirconium lactate is used as crosslinker, to further boost the viscosity of the base fluid.

As seen in FIG. 1a, the fluids that are made with diutan gum were more viscous than those made with the fluid containing CMHPG, even though the former contained less polymer and the polymer was not crosslinked. Furthermore, the fluids containing CMHPG became unstable at temperatures between 121° C. and 130° C., whereas the energized fluids containing heteropolysaccharide diutan gum could withstand temperatures up to 150° C. These results are provided to illustrate that fluids of carbon dioxide containing a sphingan such as diutan gum exhibit better stability and rheological properties than those formulated with polysaccharides conventionally used in the formulation of foamed fracturing fluid such as CMHPG at elevated temperatures.

FIG. 1b shows viscosity measurements at a shear rate of 100 s$^{-1}$ for energized fluids of carbon dioxide dispersed in aqueous solutions of diutan gum that were shown in FIG. 1a (triangles), and of xanthan gum (circles) (Rhodopol 23P® available from Rhodia Inc., 259 Prospect Plains Road CN 7500 Cranbury, N.J. 08512-7500). Results are shown for two different volume fractions of carbon dioxide (70 vol. %, filled symbols, and 40 vol. %, open symbols). The composition of the aqueous fluids containing xanthan gum are identical to those of the fluids containing diutan gum, with xanthan gum replacing diutan gum at the concentration indicated in Table 1 (0.22 wt. % of total liquid weight). It is seen in FIG. 1b that the energized fluid that contained diutan gum exhibited higher viscosities than the energized fluid that contained xanthan gum. These results are also provided to illustrate that fluids of carbon dioxide containing a sphingan such as heteropolysaccharide diutan gum exhibit better stability and rheological properties than those formulated with other heteropolysaccharides conventionally used in the formulation of foamed or energized fracturing fluids, such as xanthan gum.

Example 2

Figure 2A:
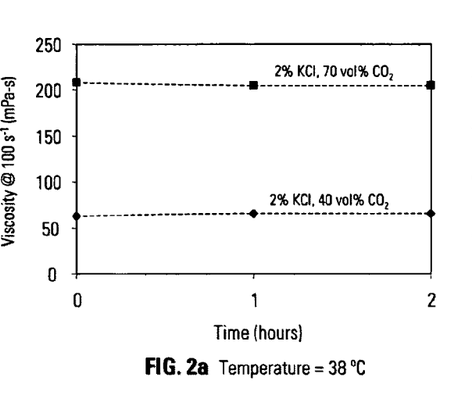
FIG. 2 shows a series of graphical FIGS. 2a 2b 2c 2d which illustrate the viscosity of energized fluids comprising carbon dioxide and a representative sphingan heteropolysaccharide as a function of time for temperatures that are meaningful to foam fracturing operations.
Figure 2B:
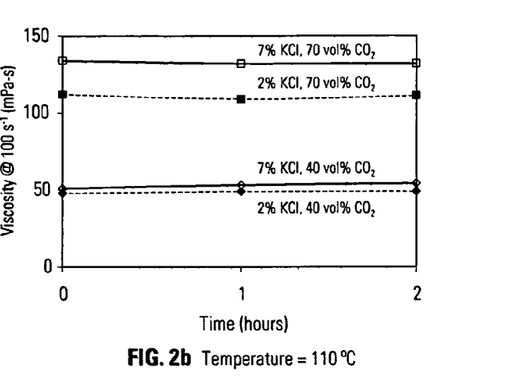
Figure 2C:
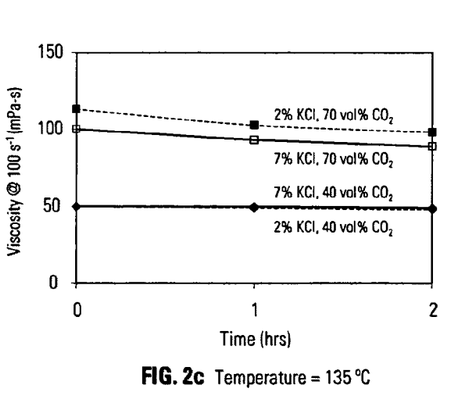
Figure 2D:
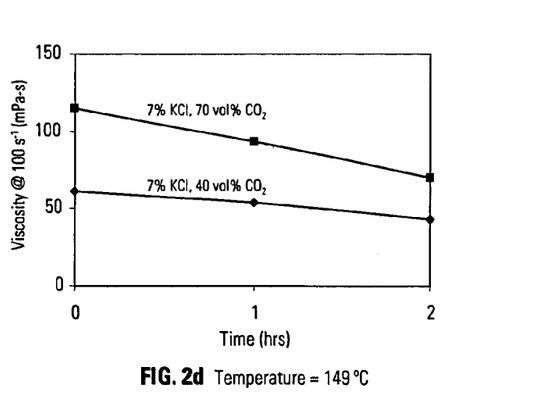

FIG. 2 is a series of graphical FIGS. 2a 2b 2c 2d which illustrate the viscosity of energized fluids comprising carbon dioxide as a function of time for temperatures that are meaningful to foam fracturing operations. The composition of the fluids used for the experiments depicted in FIG. 2a and FIG. 2b is 0.18 wt % heteropolysaccharide diutan gum, 0.3 wt % amphoteric alkyl amine Aquat 944®, potassium chloride was added at the wt % indicated in the plots, and carbon dioxide was added as indicated at the volume% based upon the total volume of gas phase and liquid phase. The composition of the aqueous fluid used for the experiments depicted in FIG. 2c is 0.18 wt % diutan gum, 0.3 wt % amphoteric alkyl amine Aquat 944®, 0.3 wt % tetraethylenepentamine, potassium chloride was added at the concentrations indicated in the plots, and carbon dioxide was added at the volume % indicated. The composition of the aqueous fluid used for the experiments depicted in FIG. 2d is 0.22 wt % diutan gum, 0.3 wt % amphoteric alkyl amine Aquat 944® (actives), 0.5 wt % tetraethylenepentamine, 7.0 wt % potassium chloride, and carbon dioxide was added at the indicated volume %. As FIGS. 2a thru 2d illustrate energized fluids containing heteropolysaccharide such as diutan gum and carbon dioxide provide viscosities effective for foamed fracturing operations, especially at elevated temperatures from about 110° C. to 150° C., for at least 2 hours, which suffices to complete most fracturing processes.

Example 3

Figure 3A:
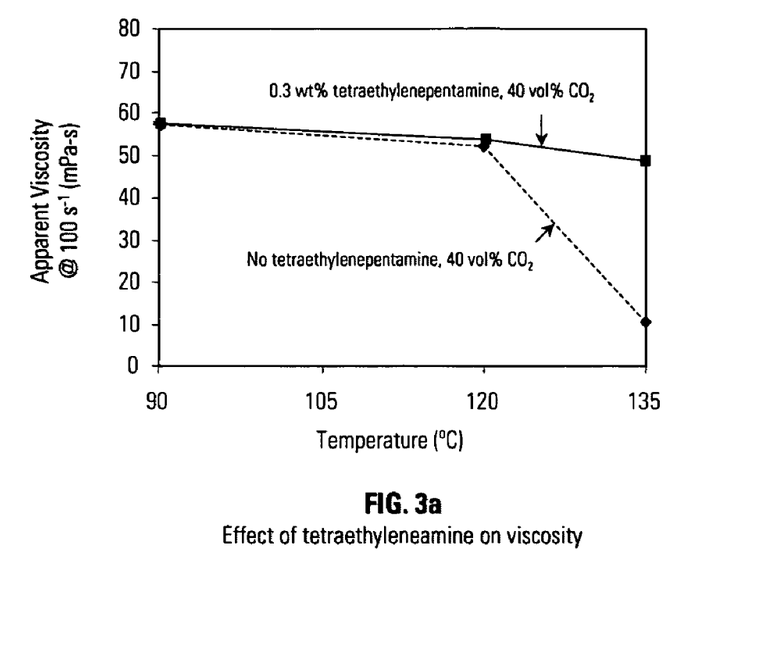
FIG. 3 shows a pair of graphical FIGS. 3a 3b which illustrate the beneficial effects of an electrolyte and an organoamino compound on energized fluid viscosity.
Figure 3B:
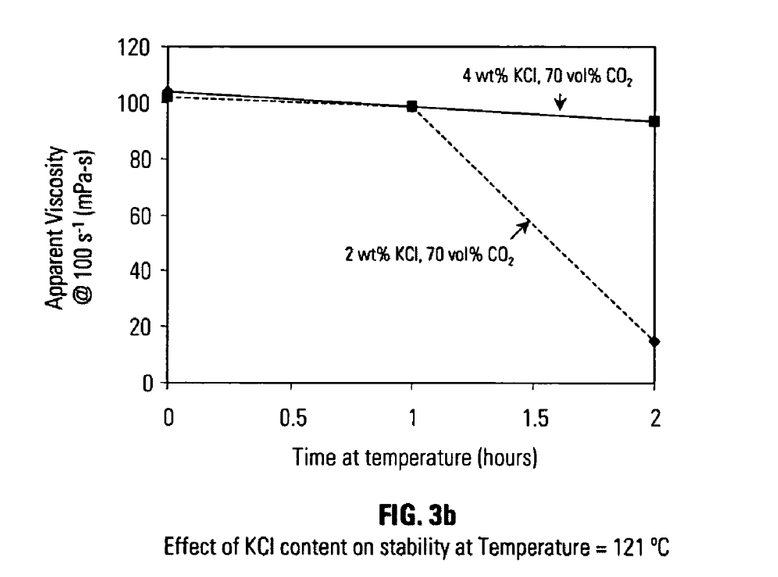

It was also found as part of this invention that increasing concentrations of electrolyte, potassium chloride for example, and an organoamino compound, for example tetraethylenepentamine, may further stabilize carbon dioxide in solutions containing heteropolysaccharides such as diutan gum. FIG. 3 shows a pair of graphical FIGS. 3a 3b which illustrate the positive effects of an electrolyte and an organoamino compound on energized fluid viscosity. FIG. 3a shows the viscosity of energized fluids containing carbon dioxide in an amount of 40% by volume based upon total fluid volume. The compositions of the solutions used in these experiments were 0.18 wt % diutan gum, 0.3 wt % amphoteric alkyl amine Aquat 944®, 2.0 wt % potassium chloride, but they differed in the amount of tetraethylenepentamine organoamino compound as indicated. As FIG. 3a indicates, including an organoamino compound improved fluid viscosity at elevated temperatures, 135° C. in this case, whereas a much lower viscosity was recorded for the same fluid in absence of the organoamino compound.

FIG. 3b illustrates the viscosity and stability of energized fluids containing carbon dioxide in an amount of 70% by volume based upon total fluid volume at a temperature of 121 ° C. The compositions of the solutions used in these experiments were 0.18 wt % diutan gum, 0.15 wt % amphoteric alkyl amine Aquat 944®, and they only differed in the content of potassium chloride electrolyte. As FIG. 3b illustrates, increasing the level of potassium chloride provides an energized fluid with better viscosity stability over typical treatment time intervals. These data show that the concomitant usage of electrolytes and organoamino compounds along with heteropolysaccharide diutan is effective to extend the ability to generate stable and viscous energized fluids at elevated temperatures of 121° C. and above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A subterranean formation treatment fluid comprising an aqueous medium, a gas component, a surfactant, an electrolyte, an organoamino compound, and a gas phase stabilizing heteropolysaccharide having a tetrasaccharide repeating unit in the polymer backbone as represented by the chemical formula:

wherein three different saccharides are present in the repeating unit, the three different saccharides including D-glucose, D-glucuronic acid, and either L-rhamnose or L-mannose; $M^+$ is an ionic species; $R^1$, $R^2$, $R^3$, $R^4$, $R^5$, $R^6$, $R^7$, $R^8$, $R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$; wherein the heteropolysaccharide is selected from the group consisting of gellan gum and gellan gum derivatives, diutan gum and diutan gum derivatives, rhamsan gum and rhamsan gum derivatives, polysaccharide S-88 and polysaccharide S-88 derivatives, polysaccharide S-198 and polysaccharide S-198 derivatives, polysaccharideNW11 and polysaccharide NW11 derivatives, and any mixtures thereof wherein the gas component comprises from about 10% to about 90% of total fluid volume percent; wherein the fluid is a stable energized fluid at temperatures of 121° C. and above; wherein the surfactant is an amine functional surfactant selected from the group consisting of zwitterionic, amphoteric, cationic and any combination thereof, incorporated in an amount of from about 0.02 wt % to about 5 wt % of total liquid phase weight; and wherein the organoamino compound is selected from the group consisting of tetraethylenepentamine, triethylenetetramine, pentaethylenehexamine, triethanolamine, and any mixtures thereof, and is incorporated in an amount from about 0.01 wt % to about 2.0 wt % based on total liquid phase weight, and preferably in an amount from about 0.05 wt % to about 1.0 wt % based on total liquid phase weight.

2. The fluid according to claim 1 wherein the heteropolysaccharide is a diutan gum having a tetrasaccharide repeating unit in the polymer backbone as represented by the chemical formula:

wherein $M^+$ is an ionic species, and the weight average molecular weight (Mw) from about $10^5$ to about $10^7$.

3. The fluid according to claim 1 wherein the surfactant is an amine functional surfactant selected from the group consisting of zwitterionic, amphoteric, cationic and any combination thereof, incorporated in an amount of from about 0.05 wt % to about 2 wt % of total liquid phase weight.

4. The fluid according to claim 1 wherein the electrolyte is member selected from the group consisting of organic acids, organic acid salts, inorganic salts, and combinations of one or more organic acids or organic acid salts with one or more inorganic salts, and the electrolyte is incorporated in an amount of from about 0.01 wt % to about 12.0 wt % of the total liquid phase weight.

5. The fluid according to claim 1 wherein the electrolyte is potassium chloride and is incorporated in an amount of from about 1.0 wt % to about 8.0 wt % of the total liquid phase weight.

6. The fluid according to claim 1 wherein said gas component comprises a gas selected from the group consisting of carbon dioxide, nitrogen, air and any mixtures thereof.

7. The fluid according to claim 1 wherein said gas component is carbon dioxide or a mixture of carbon dioxide and a gas selected from the group consisting of nitrogen, air and any mixtures thereof.

8. The fluid according to claim 1 wherein said gas component comprises from about 30% to about 80% of total fluid volume percent, and more preferably from about 40% to about 70% of total fluid volume percent.

9. The fluid according to claim 1 wherein the heteropolysaccharide is incorporated in an amount from about 0.01% to about 1.00% by weight of total liquid phase weight.

10. The fluid according to claim 1 wherein the heteropolysaccharide is incorporated in an amount from about 0.10% to about 0.40% by weight of total liquid phase weight.

11. The fluid according to claim 1 further comprising a proppant.

12. The fluid according to claim 11 wherein the proppant is selected from the group consisting of sand, walnut shells, sintered bauxite, glass beads, ceramic materials, naturally occurring materials, or any mixtures thereof.

13. The fluid according to claim 1 further comprising a crosslinker containing an ion selected from the group consisting of chromium, iron, boron, titanium, and zirconium.

14. The fluid according to claim 1 further comprising a breaker.

15. The fluid according to claim 1 further comprising a fiber component.

16. A subterranean formation treatment fluid comprising an aqueous medium, a carbon dioxide gas component incorporated in an amount from about 40% to about 70% of total fluid volume percent, a gas phase stabilizing diutan heteropolysaccharide incorporated in an amount from about 0.10% to about 0.40% by weight of total liquid phase weight, an amphoteric surfactant, a potassium chloride electrolyte, and tetraethylenepentamine, wherein the fluid is a stable energized fluid at temperatures of 121° C. and above; and wherein the surfactant is incorporated in an amount of from about 0.02 wt % to about 5 wt % of total liquid phase weight.

17. The fluid according to claim 15 wherein the tetraethylenepentamine is incorporated in an amount from about 0.01 wt % to about 2.0 wt % based on total liquid phase weight, and preferably in an amount from about 0.05 wt % to about 1.0 wt % based on total liquid phase weight.

18. The fluid according to claim 16 further comprising a proppant.

19. The fluid according to claim 16 wherein the surfactant is an amine functional surfactant incorporated in an amount of from about 0.05 wt % to about 2 wt % of total liquid phase weight.

20. The fluid according to claim 16 wherein the potassium chloride electrolyte is incorporated in an amount of from about 0.01 wt % to about 12.0 wt % of the total liquid phase weight.

* * * * *